Figure 1:
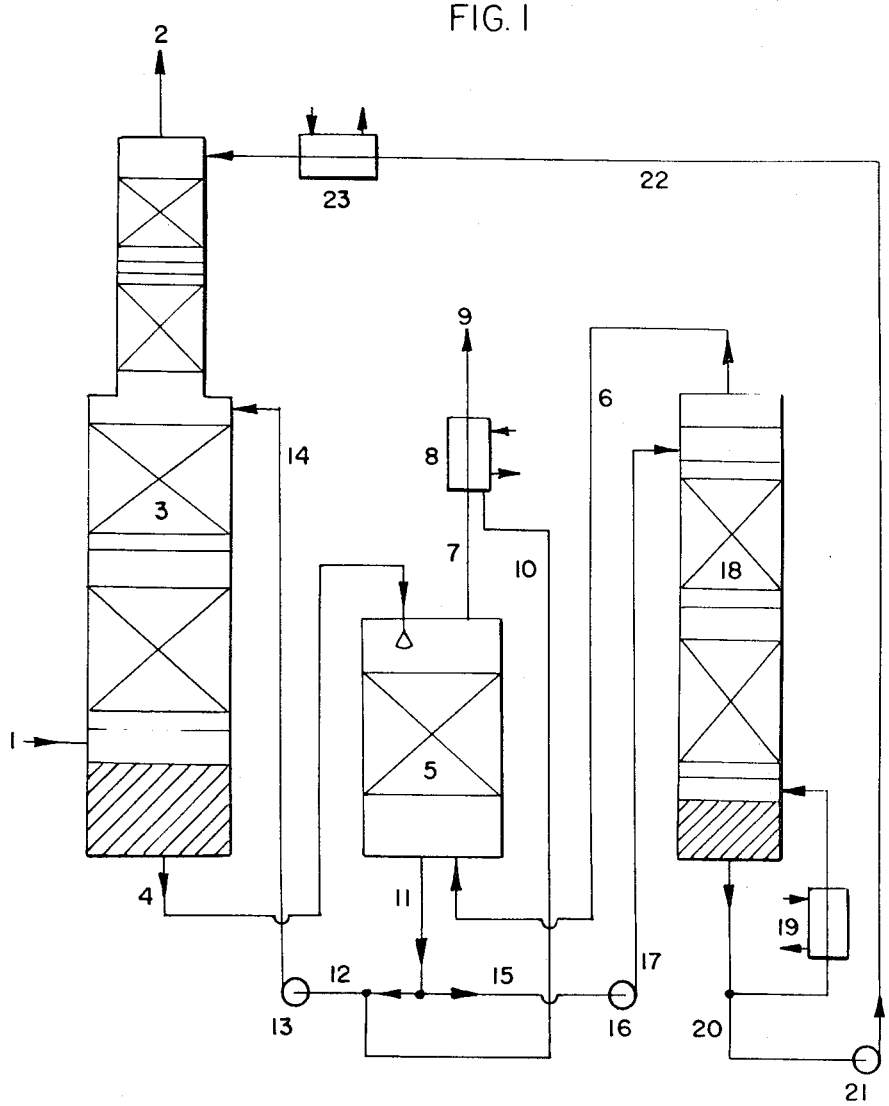

United States Patent

[11] 3,622,267

[72] Inventors Ernst Bartholome
Heidelberg;
Hans Wilhelm Schmidt, Mannheim;
Juergen Friebe, Wachenheim, all of
Germany
[21] Appl. No. 3,779
[22] Filed Jan. 19, 1970
[45] Patented Nov. 23, 1971
[73] Assignee Badische Anilin- & Soda-Fabrik Aktiengesellschaft
Ludwigshafen am Rhine, Germany
[32] Priorities Jan. 22, 1969
[33] Germany
[31] P 19 03 065.0;
Jan. 30, 1969, Germany, No. P 19 04 428.1

[54] PROCESS FOR REMOVING CARBON DIOXIDE FROM GAS MIXTURES
3 Claims, 2 Drawing Figs.

[52] U.S. Cl..................................................... 23/2 R
[51] Int. Cl..................................................... B01d 53/00
[50] Field of Search.......................................... 23/2, 3; 55/20, 68, 84, 93

[56] References Cited
UNITED STATES PATENTS
2,638,405    5/1953    Frazier........................ 23/2
3,139,324    6/1964    Housset....................... 23/2

Primary Examiner—Reuben Friedman
Assistant Examiner—R. W. Burks
Attorney—Johnston, Root, O'Keeffe, Keil, Thompson & Shurtleff ABSTRACT: Separation of carbon dioxide and hydrogen sulfide from gases by scrubbing the gases with a 2.5 to 4.5 molar aqueous solution of methydiethanolamine at a temperature of from 70° to 110° C. From 0.1 to 0.4 mole of monomethylmonoethanolamine is also added to the solution for the removal of any carbonyl sulfide.

PROCESS FOR REMOVING CARBON DIOXIDE FROM GAS MIXTURES

It is known that carbon dioxide can be scrubbed out from gas mixtures, for example from synthesis gas or other gases containing carbon dioxide, with aqueous solutions of alkanolamines under pressure.

Primary and secondary amines such as monoethanolamine, diethanolamine and diisopropanolamine are mainly used. Triethanolamine has recently been introduced into industry as a solvent and is used especially for the purification of synthesis gases at high partial pressures of carbon dioxide. Scrubbing of the gas is carried out with primary and secondary amines in 2 to 4 molar solutions in the temperature range of 40° to 70° C. In the case of triethanolamine for example from 2.25 to 2.5 molar solutions and temperatures of from 50° to 80° C. may be used for the absorption.

Since the purification of synthesis gas is an industrial process, the heat utilization which is achieved in the various methods is decisive for the choice of the method used. Regeneration is carried out in the usual manner by releasing the pressure followed by heating up and stripping the solvent with steam.

It is a disadvantage of the prior art systems in the case of primary and secondary amines that considerable quantities of heat (about 2,000 kcal. per m.$^3$ (STP) of $CO_2$) are required. In the case of triethanolamine, the heat consumption is small but the loading capacity is lower and the end purity which can be achieved is therefore limited. The absorption stage in all the methods is operated at temperatures which are far below the regeneration temperature which is necessary for high end purities.

We have now found that the said disadvantages can be avoided and the absorption in the separation of carbon dioxide by means of aqueous solutions of alkanolamines can be carried out at fairly high temperatures in the vicinity of the regeneration temperature by using a 2.5 to 4.5 molar aqueous solution of methyldiethanolamine as the solvent and carrying out the absorption of the gas at a temperature of the solvent in the bottoms of the absorber of from 70° to 110° C. High end purities can be achieved by this method with a fairly small circulated amount and low heat consumption. As compared with primary and secondary amines there is a considerable saving of heat and as compared with triethanolamine there is a smaller circulation of solvent and a higher end purity.

The process according to the invention may be carried out in one or two stages depending on the necessary end purity and permissible heat consumption. In the one-stage method, a column is used which is provided either with tower packing or trays and the gas containing carbon dioxide is freed from carbon dioxide in countercurrent with a 2.5 to 4.5 molar aqueous solution of methyldiethanolamine which is fed into the top of the absorber at about 70° to 90° C. and reaches a temperature of up to 110° C. in the bottoms. The loaded solvent may be expanded in one or more stages, for example through a flash turbine and then substantially regenerated in a desorption column fitted with tower packing or trays which is heated indirectly or directly. The solvent fed to the desorption column may be heated up in a countercurrent heat exchanger by the effluent solvent. Generally however this heat exchanger can be dispensed with because of the high temperature in the absorption stage. The solvent is then adjusted to the desired top temperature of the absorber by means of a cooler and supplied by a pump to the top of the absorber.

Another embodiment of the process according to the invention consists in feeding some of the solvent at a lower temperature to the top of the absorber and the remainder at a higher temperature at a lower point of the absorber. The necessary exchange surface area is then greater but a higher end purity may be achieved.

After the final expansion in the two-stage method the bulk of the solvent is fed in at a central point in the absorption tower and the minor proportion, as in the one-stage method, is regenerated in the desorber and pumped to the top of the absorber.

The necessary amount of solvent and circulation of solvent can be further decreased by heating the solvent prior to expansion. Naturally an equivalent amount of heat then has to be withdrawn prior to return to the absorber.

It is particularly advantageous to use the process according to the invention in the purification of gases which are under a high partial pressure of carbon dioxide, for example gases such as are obtained in the partial oxidation of crude oil or heavy fuel oil. Synthesis gas such as is obtained for the production of ammonia with partial pressures of carbon dioxide of 4 to 6 atmospheres by reforming hydrocarbons with steam, may also be freed from carbon dioxide by this method under favorable conditions.

In the one-stage method at total pressures of 20 to 100 atmospheres, from 1,000 to 2,000 p.p.m. of $CO_2$ in the purified gas, and in the two-stage method from 100 to 200 p.p.m. of $CO_2$, can be achieved. Loading differences of from 15 to 35 m.$^3$ (STP) of $CO_2$ per m.$^3$ of solvent are achieved. Heat consumption is from about 0.3 to 0.8 kcal./m.$^3$ (STP) of $CO_2$.

Nowadays synthesis gases which contain COS as well as $CO_2$ and $H_2S$ are available in increasing amounts. Gases which contain 5 to 10 percent by volume of $CO_2$, 0.0 to 0.5 percent by volume of $H_2S$ and 0.0 to 500 p.p.m. by volume of COS are obtained particularly in the production of synthesis gases from heavy fuel oils. It is essential for example for use in oxo or methanol synthesis, that acid constituents containing sulfur should be scrubbed out almost completely, i.e., down to less than 3 p.p.m.

The process according to the invention may also be used in the embodiments described above for this purpose by using the absorption liquid an aqueous solution which contains 0.1 to 0.4 mole/liter of monomethylmonoethanolamine as well as the stated amount of methyldiethanolamine.

The following examples illustrate the invention.

EXAMPLE 1

FIG. 1 illustrates a system for a two-stage method. 10,000 m.$^3$ (STP) per hour of a synthesis gas is introduced through line 1 into the bottoms of an absorber 3 filled with tower packing and is scrubbed countercurrent with a 3.5 molar aqueous methyldiethanolamine solution. The synthesis gas is under a pressure of 40 atmospheres and contains 30 percent by volume of carbon dioxide, 3 percent by volume of carbon monoxide and 67 percent by volume of hydrogen. The gas leaves the top of the absorber through line 2 with 0.01 percent by volume of carbon dioxide. The amount of 125 m$^3$ per hour of washing medium draining off through line 4 at a temperature of 100° C. is expanded to 1.1 atmospheres in a container 5 which is filled with tower packing. Vapor issuing from a desorption column 18 is also introduced into this container 5 through line 6. The whole of the carbon dioxide removed from the synthesis gas leaves saturated with steam through line 7, is cooled in a cooler 8 and escapes through line 9. The condensate formed passes through line 10 into line 12. The stream of solvent leaving through line 11 at a temperature of 85° C. is divided. The major portion (113 m.$^3$ per hour) is passed through line 12 to pump 13 and through line 14 at 85° C. into the lower portion of absorber 3. The remainder (12 m.$^3$ per hour) is passed through line 15 to pump 16 and through line 17 to the top of the desorber 18 which is operated at a pressure of 1.2 atmospheres. The amount of heat required ($1.6 \times 10^6$ kcal./hour) is supplied to the system by means of a boiler 19. The regenerated solvent flows through line 20 to pump 21 and is pumped thence through line 22 and cooler 23 at a temperature of 75° C. to the top of the absorber 3. The amount of heat required for example for scrubbing with monoethanolamine should be about $6 \times 10^6$ kcal./hour. With an aqueous triethanolamine solution, about 0.05 percent of $CO_2$ may be calculated in the purified gas under the same conditions. The one-stage method in which the stream of solvent is not divided downstream of line 11 may be used with success when the partial pressure in the crude gas from line 1 is not so high and/or

EXAMPLE 2

Figure 2:
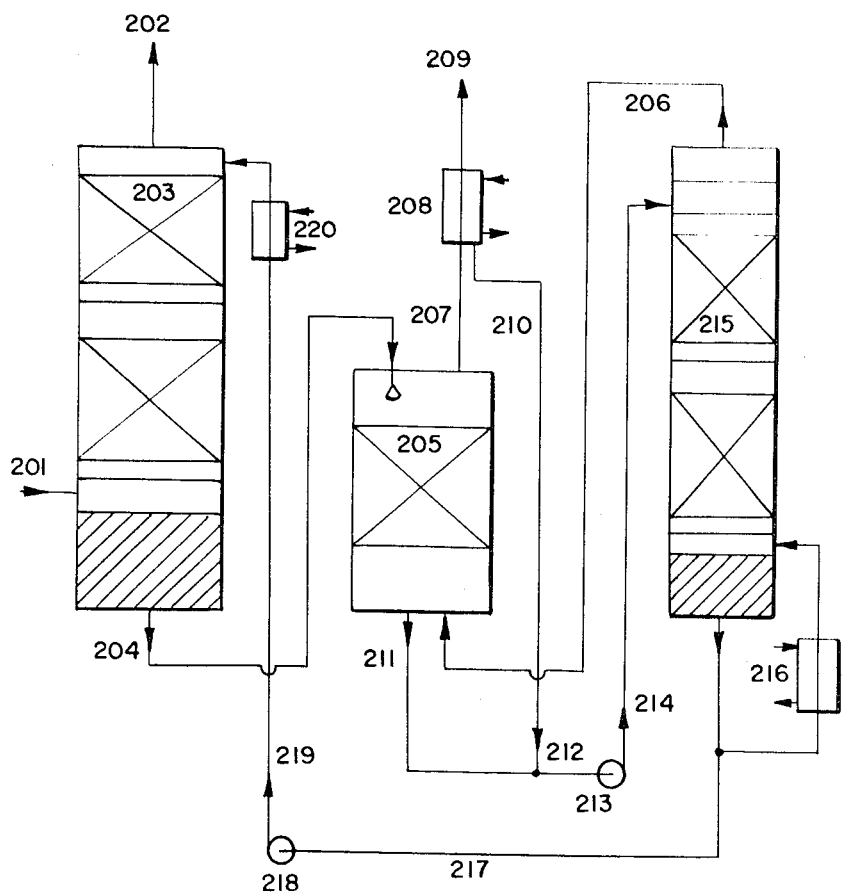

A system suitable for the one-stage method is illustrated in FIG. 2. 60,000 m.$^3$ (STP) per hour of a synthesis gas is introduced into the bottoms of an absorber 203 filled with tower packing through line 201 and is scrubbed countercurrent with an aqueous solution containing 3.25 moles per liter of methyldiethanolamine and 0.25 mole/liter of monomethylmonoethanolamine. The synthesis gas is under a pressure of 40 atmospheres and contains 5.80 percent by volume of carbon dioxide, 0.28 percent by volume of hydrogen sulfide, 0.02 percent by volume of carbon oxsulfide, 47.42 percent by volume of hydrogen, 45.27 percent by volume of carbon monoxide, 0.62 percent by volume of nitrogen and 0.59 percent by volume of methane. The gas leaving the top of the absorber at 202 contains 0.01 percent by volume of carbon dioxide, 0.0002 percent by volume of hydrogen sulfide and 0.0001 percent by volume of carbon oxysulfide. The loaded solvent at a temperature of 85° C. leaving through line 20 percent in an amount of 150 m.$^3$/h. is expanded to 1.1 atmospheres in container 205 which is filled with tower packing. Vapors from the desorption column 215 are also fed through line 206 into this container. The whole of the carbon dioxide and hydrogen sulfide removed from the synthesis gas and the carbon oxysulfide which has not yet been hydrolyzed leave saturated with steam through line 207, are cooled in a cooler 208 and escape through line 209. The condensate formed is passed through line 210 into line 212. The stream of solvent flowing from line 211 at a temperature of 83° C. is passed through line 212 to pump 213 and through line 214 to the top of the desorber 215 which is operated at a pressure of 1.2 atmospheres. The necessary amount of heat (5.0×10$^6$ kcal./h.) is supplied to the system by a boiler 216. The regenerated solvent flows through line 217 to pump 218 and thence is pumped through line 219 and a cooler 220 at a temperature of 70° C. to the top of the absorber 203.

We claim:

1. A process for separating carbon dioxide, carbon oxysulfide and hydrogen sulfide as impurities from a synthesis gas containing the same, which process comprises scrubbing the gas with a solvent consisting essentially of a 2.5 to 4.5 molar aqueous solution of methyldiethanolamine containing 0.1 to 0.4 mole per liter of monomethylmonoethanolamine at a temperature of from 70° to 110° C. and at a pressure in the range of from 20 to 100 atmospheres.

2. A process as claimed in claim 1 wherein said scrubbing is carried out in more than one stage.

3. A process as claimed in claim 1 wherein the synthesis gas being treated is obtained in the partial oxidation of a crude oil or heavy fuel oil.

* * * * *